Patented July 30, 1935

2,009,610

UNITED STATES PATENT OFFICE 2,009,610

MENINGOCOCCUS TOXIN

Newell S. Ferry, Detroit, Mich., assignor to Parke Davis & Company, Detroit, Mich., a corporation of Michigan No Drawing. Application June 1, 1931, Serial No. 541,530

10 Claims. (Cl. 167—78)

The invention relates to the production of biological medicaments useful in the diagnosis and treatment of meningitis and also useful in determining susceptibility to the disease.

I have discovered that the meningococcus when grown under suitable conditions produces a heretofore unrecognized exotoxin and I have invented methods of securing this toxin in high concentration and of producing from it a true antitoxin which can be used for quantitative neutralization of the toxin.

As a result of this invention new standardized medicaments can be made available for the diagnosis and treatment of meningitis, namely a toxin, an antitoxin, and combinations of toxin and antitoxin.

The toxin may be used for determining susceptibility to meningitis, for producing the antitoxin and for standardizing the latter. Possibly it may also be of value in the treatment of the condition either by injection as such or in its neutralized form. The artificially made antitoxin is useful for the direct treatment of the infection and especially for the relief from toxic symptoms. It may also be used for the preparation of neutralized toxin as well as for the identification of the meningococcus because of its specific toxin neutralizing properties.

In preparing meningococcus toxin in accordance with my invention it is preferable to utilize hormone broth as the culture medium since the concentration and yield of the toxin depend upon the selection of a medium peculiarly adapted for the purpose. The following formula has been used successfully.

| | Grams |
|---|---|
| Chopped lean beef | 500 |
| Peptone | 10 |
| Gelatin | 10 |
| Salt | 5 |
| Whole egg | 1 |
| Water | 1000 |

In preparing this broth care is taken not to heat the mixture over 68° C., as heat has a tendency to destroy the growth stimulating or hormone properties of the meat and these are essential for a luxuriant growth of the organisms and a high grade of toxin. In filtering the mixture it is not allowed to come in contact with anything of a vegetable nature as this is liable to absorb the hormones. The gelatin in the mixture is not only useful in extracting the hormones from the meat but aids in supporting on the surface of the media the pellicle formed by the bacteria during growth.

The culture medium is inoculated with seed cultures of meningococcus and the organisms are allowed to grow until a heavy pellicle has formed on the surface of the media whereupon this pellicle is transferred into flasks containing the same medium.

The culture is incubated not longer than four to six days. Incubation is stopped at this point while most of the organisms are still alive, in order to obtain the soluble specific toxin as strong and unadulterated as possible. Further incubation of the culture will result in death of the organisms and will permit of the formation of autolysates and the liberation of endotoxin. These products, in themselves, are more or less poisonous or toxic and will have a tendency to mask or destroy the specific action of the soluble extracellular toxin.

Following withdrawal of the culture from the incubator it is clarified of organisms either by means of filtration or centrifugation. The filtrate, which contains the specific soluble toxin, has the following properties: When injected into the animal body in increasing doses it will stimulate the formation of an antitoxin in that animal. When diluted and injected intradermally into susceptible human beings it will produce an inflammatory reaction at the site of injection. This reaction will not appear if the toxin is previously mixed with a neutralizing dose of its homologous antitoxin, or with serum from patient convalescing from meningococcus meningitis. The toxin in sufficient doses is fatal to small animals when injected into the body. When mixed with a neutralizing dose of its homologous antitoxin or with the above mentioned convalescent serum, this toxic action on small animals is not apparent. Also when the animal is previously injected with a sufficient amount of the antitoxin or convalescent serum severe reaction will not appear.

These properties when considered collectively are interpreted as an indication of the presence in the filtrate of an extracellular toxin and proof of the specific nature of this toxin.

To standardize the toxin, the undiluted meningococcus is diluted and compared with a diluted meningococcus toxin which has already been standardized by a skin reaction or other specific reactions on susceptible individuals or animals. In carrying out the standardization test or the comparison between the new toxin and the standard toxin, various dilutions are made of the new lot of toxin and these are compared with a dilution of standard toxin which will just give a positive skin reaction or other reaction decided upon in a susceptible individual or animal.

Dilute or weak solutions of the toxin of known strength may be employed to determine susceptibility to meningococcus toxin and meningitis by means of the skin test. The meningococcus toxin of known strength is preferably diluted with physiologic salt solution so that 0.1 cc. will represent one skin test dose. The test consists of an intracutaneous injection of 0.1 cc. of the diluted standardized toxin preferably on the flexor surface of the forearm. The reaction is noted at the end of 24 hours. The reaction is characterized by an area of reddening which should be at least 1 cm. in diameter. This reaction is controlled by injecting the same amount of toxin, in corresponding position on the other arm, the toxicity of which has been destroyed by heating or by neutralizing with meningococcus antitoxin.

The meningococcus toxin is used for the production of the meningococcus antitoxin. Animals immunized with injections of meningococcus toxin will produce an antitoxin which will neutralize meningococcus toxin when mixed with it in proper quantities.

The preparation of the meningococcus antitoxin is preferably carried out in the following manner: The meningococcus toxin prepared in the manner above described is injected into animals, preferably horses, in gradually increasing doses, beginning with a dose small enough not to produce severe symptoms in the animal, and gradually increasing to the tolerance of the animal. The toxin used in these injections need not necessarily be sterile for in some cases it may be advisable to introduce the living organism with the toxin. When a sterile toxin is injected it may either be a product in which the organisms have been killed and are still contained in the liquid, or it may be a solution which has been freed from all organisms. After preliminary tests show the antitoxin is of sufficient strength as tested against the meningococcus toxin, the horse or other animal is bled and the serum or plasma may be concentrated and refined in order to avoid unnecessary serum reactions. The meningococcus antitoxin is then standardized by determining how many skin test doses of a standard meningococcus toxin one cubic centimeter of the antitoxin will neutralize.

The use of the toxin serves as a method of recognizing the organism which is capable of producing meningitis infections. The organism to be identified is isolated in pure culture and grown on suitable media, such as hormone broth. After a reasonable incubation the culture is clarified of organisms or sterilized by filtration, centrifugation or other suitable means and the sterile filtrate is tested for its toxicity, first comparing it with a meningococcus toxin of known strength. After it is determined that it produces a skin reaction on individuals known to be susceptible to meningitis, it is mixed with the new meningococcus antitoxin which is now shown to neutralize the newly discovered meningococcus toxin. If the toxin is so neutralized by the meningococcus antitoxin that it will no longer produce a skin reaction, it may be considered that the organism under consideration is capable of producing a toxin specific to meningitis infections and that the organism is also specific.

It is further to be understood that meningococcus toxin may be obtained in several forms, first containing live organisms, second containing killed organisms, and third free from all organisms. All of these forms have certain applications for medical use, particularly for the preparation of the antitoxin. In the appended claims the term toxin is intended to cover any of the above mentioned forms while the term sterile toxin refers to a product which may or may not contain killed organisms but contains no living organisms. Whenever it is intended to refer to the toxin itself free from all organisms, I have specifically stated that the product is free from organisms.

The meningococcus, the cause of meningococcus meningitis, known also as epidemic cerebrospinal meningitis or acute cerebrospinal fever, is known to comprise four distinct types. These types, although culturally and morphologically alike, differ from one another in their antigenic properties.

Heretofore, it has been possible to classify these organisms into the four separate types only by means of certain serological tests known as agglutination and complement fixation tests.

In discovering that the meningococcus produces a soluble toxin which in turn can stimulate the formation of an antitoxin, I have discovered also that the four types of the meningococcus produce four distinct types of toxins homologous to the four types of the organism and that these four toxins stimulate four distinct antitoxins specific to the four types.

I have discovered, therefore, a new way to differentiate the four types from one another by means of these four toxins and by the ability of their specific antitoxins to neutralize their four homologous toxins.

In addition to these four specific toxins, I have discovered that there is a toxin more or less common to all four types and that this toxin, in turn, stimulates the formation of a common antitoxin which will neutralize it.

I have discovered, therefore, that the meningococcus, which is known to be composed of four distinct types, produces not only a toxin common to all four types but toxins specific to the four individual types. Also that this common toxin stimulates an antitoxin which will neutralize it and that the four separate toxins, specific to the four types of the organism, will stimulate the formation of four antitoxins which will neutralize their homologous toxins. Also, that by means of these four specific toxins and antitoxins, I have a new means of classifying the organism into its four types and of diagnosing susceptibility to these different types.

What I claim as my invention is:

1. The process of obtaining meningococcus exotoxin which comprises inoculating hormone broth with a seed culture of meningococcus, growing the organism until a pellicle is formed, transferring the pellicle to a flask containing hormone broth, growing for two to six days and separating the solid matter from the liquid.

2. A true extracellular toxin specific to meningitis infections obtained from a culture of meningococcus and capable of being neutralized by meningococcus antitoxin.

3. A true extracellular toxin specific to meningitis infections obtained from a culture of meningococcus and capable of being neutralized by meningococcus antitoxin, said toxin being sterile and free from bacterial cells.

4. A true antitoxin specific to meningitis infections comprising a serum obtained from an animal after injection with a true extracellular toxin specific to meningitis infections which serum is capable of neutralizing said extracellular toxin.

5. A true antitoxin specific to meningitis infections comprising a serum obtained from an animal after injection with a true extracellular sterile bacteria-free toxin specific to meningitis infections which serum is capable of neutralizing said extracellular toxin.

6. The process of obtaining a true extracellular meningococcus toxin comprising growing meningococcus on a suitable liquid culture medium to form a pellicle, maintaining said medium at incubating temperatures until said pellicle begins to disintegrate due to the natural death of the organisms and eliminating said organisms before any substantial autolysis takes place.

7. The process of obtaining a true extracellular meningococcus toxin comprising growing meningococcus on a suitable liquid culture medium for a period not substantially greater than six days and separating the organisms from the extracellular toxin in liquid solution.

8. The process of obtaining a true extracellular meningococcus toxin comprising growing meningococcus on a suitable liquid culture medium to form a pellicle, maintaining said medium under incubating conditions for a period not substantially exceeding six days, separating the organisms from the liquid and sterilizing the liquid.

9. The process of obtaining an antitoxin specific to meningococcus infections comprising growing meningococcus on a suitable culture medium for a period not substantially exceeding six days thereby obtaining a true extracellular toxin specific to meningococcus infections, injecting said true extracellular toxin into an animal and obtaining from the blood serum of said animal a true antitoxin specific to meningococcus infections.

10. The process of obtaining an antitoxin specific to meningococcus infections comprising growing meningococcus on a suitable liquid culture medium for a period of time not substantially greater than six days, separating the organisms from said liquid thereby forming a true extracellular toxin, injecting said true extracellular toxin into an animal and obtaining from the blood serum of said animal a true antitoxin specific to meningococcus infections.

NEWELL S. FERRY.